Patented June 26, 1945

2,379,268

UNITED STATES PATENT OFFICE 2,379,268

PROCESS FOR PREVENTING FOAMING DURING REMOVAL OF OLEFIN MONOMERS

John C. Zimmer, Union, N. J., assignor to Standard Oil Development Company, a corporation of Delaware No Drawing. Application May 2, 1942,
Serial No. 441,442

12 Claims. (Cl. 260—28)

This application relates to synthetic rubber-like polymers; relates particularly to the recovery of the polymer from the emulsion in which it is prepared; and relates especially to methods for preventing foaming of the emulsion during the separation of unreacted products from the emulsion.

It has been found possible to prepare a highly valuable rubber-like polymer by an emulsion polymerization of butadiene, either alone, or mixed with copolymerizable compounds, such as acrylonitrile or styrene, or the like, in water, in the presence of an emulsifier, such as sodium oleate or sodium stearate and a catalyst such as a persulfate, a perborate, hydrogen peroxide and the like. However, the reaction does not go to completion in any reasonable time and when the reaction is carried to completion, the resulting polymer is not as good as when the reaction is stopped short of completion. This situation makes necessary the separation of the unreacted components from the emulsified polymer. Difficulty is, however, encountered in obtaining a clean separation of the unreacted components since the mixture foams very badly during distillation and stripping and the unreacted components, during removal, carry with them considerable quantities of the emulsified polymer which represents a loss of valuable components and a contamination of the reactants which interferes with their subsequent use.

The present invention is based upon the discovery that certain high melting waxes and wax like esters, either as such or in solution in oil, effectively suppress the production of foam during the "stripping" of the polymerized latex to remove the unreacted components.

Thus, an object of the invention is to "strip" unreacted components from a synthetic polymer latex without contamination of the removed reactants. Another object of the invention is to "strip" unreacted components from a synthetic polymer latex in the presence of a waxy substance. Still other objects and details of the invention will be apparent from the following description.

In the emulsion polymerization of butadiene or the emulsion copolymerization of butadiene with acrylonitrile or styrene or the like, the reactants are customarily emulsified in water. The reactant may consist of 100 parts of butadiene, or mixtures of from 90 parts of butadiene with 10 parts of acrylonitrile or styrene, to 60 parts of butadiene with 40 parts of acrylonitrile or styrene; in from 100 to 400 parts of water. The emulsion is maintained by the presence of from 0.5 to 20 parts of an emulsifier, such as sodium oleate or other water soluble soap, and the reaction is promoted by the presence of 0.1 to 3 parts of a catalyst, such as potassium persulfate or hydrogen peroxide or the like. The reaction is conducted at a temperature within the range of 25 to 60° C. for a time interval of from 5 to 50 hours; to yield a latex in which the reactants may be preferably from 60% to 90% polymerized. This reaction mixture is the raw material for the present invention.

To this reaction mixture, when the reaction has reached the desired stage, there is added an appropriate wax or other waxy substance which serves as an anti-foaming agent. This material preferably is an ester wax such as candelilla wax, either as such or preferably dissolved in a solvent such as light petroleum oil, benzol, turpentine or the like. This material is preferably added in the proportion of 0.1 part to 1.0 part per 100 parts of the emulsion polymerizate. Alternatively, carnauba wax or Japan wax, or the hydrocarbon or ester type of mineral wax, such as montan wax, may be used. Other materials of the same general physical characteristics are also usable including such substances as water-insoluble soaps of aluminum, calcium, zinc and the like, particularly soaps of these metals containing palmitic, stearic or the higher hydrocarbon, fatty acid substances, particularly those derived from high melting point ester waxes by hydrolysis which contain more than 18 carbon atoms.

The exact nature of the effect is not as yet clearly known, but it appears that any substance which will provide minute, solid particles in the mixture will serve to break the foam bubbles or lather. It may be that a surface tension effect is also involved and that the surface tension on these particles is sufficiently different from the solid particles of the polymer to give the desired effect. This appears as a likely explanation in view of the fact that certain of the silicates, the aluminates, the plumbites and the like, as well as certain of the metallic oxides such as zinc or aluminum oxides or talc, wood flour asbestine, whiting or the like will also serve to break the foam bubbles. Obviously, however, only substances which are satisfactory as compounding agents or fillers in the finished rubbery polymer are usable for this purpose, since otherwise they must be removed, which is a highly undesirable additional step.

Example 1

A mixed polymerizate of butadiene with acrylonitrile was prepared as above described, and carried to approximately 85% completion of the polymerization reaction. To 100 parts of the latex material (amounting to about 28% solids) there was then added approximately 0.32 part of a candelilla wax solution containing 0.08 part of the candelila wax and 0.24 part of a light petroleum oil. Pressure was then released from the reaction mixture to flash off the unreacted butadiene. The emulsion was then "stripped" by the passage of a current of steam therethrough to remove residual traces of butadiene and the unreacted acrylonitrile. During this "stripping" step, substantially no foaming or lathering was encountered but the current of steam and acrylonitrile in bubble form broke away from the surface of the mixture cleanly and free from any trace of latex foam, carrying with it the butadiene and unreacted acrylonitrile, to leave a clean, "stripped" latex in a highly advantageous condition for coagulation and removing of the polymer, and permitting a clean recovery of the unreacted butadiene and acrylonitrile.

The reaction is not limited to the stripping of emulsions containing butadiene, but is equally applicable to the stripping of emulsion polymers of chloroprene as well as the emulsion polymers of isobutylene with butadiene; and the diolefin interpolymers with styrene, the unsaturated ketones, the vinyl naphthalenes, the various unsaturated esters and the like.

Example 2

Butadiene and styrene were copolymerized using the immersion technique described above and the reaction was carried to 80% conversion. The reaction mixture was then cooled and the unreacted butadiene allowed to flash off. After adding an emulsion of phenyl beta naphthylamine stabilizer to the resulting latex, 100 parts of the mixture was transferred to a steam stripper and was stripped with steam at reduced pressure to remove unreacted styrene. Foaming was very prevalent until 0.5 part of a 25% solution of montan wax in spindle oil per 100 parts of latex was added. This addition suppressed the foaming completely and greatly facilitated the stripping operation.

Example 3

In order to demonstrate the applicability of such foam suppressors to the stripping of other synthetic rubber latices, a sample of neoprene latex containing unreacted chloroprene was stripped using 0.5 part of the Japan wax solution according to the method described in Examples 1 and 2. Here again the addition of the wax produced a marked decrease in the foaming tendency.

Similarly, the use of oil or hydrocarbon solvent solutions of other waxes and of the water insoluble soaps of calcium, aluminum, zinc, magnesium and similar metals with the higher molecular weight fatty acids, such as stearic, palmitic, linoleic, linolenic acid and the like, are similarly usable with the synthetic polymer latex, to prevent foaming of the latex during the steam stripping operation to remove unreacted components.

Similarly, in some instances, the low melting waxes are usable alone, without the presence of a hydrocarbon solvent; and even some of the finely divided, powdery, inorganic materials, such as zinc oxide, talc and the like, are usable to prevent foaming in the same way.

Thus, the invention provides a means for preventing foaming of synthetic latices during the stripping out from the latex of volatile components, by the use of waxes, either as such or in hydrocarbon solution.

While there are above disclosed but a limited number of embodiments of the invention, it is possible to produce still other embodiments without departing from the inventive concept herein disclosed, and it is therefore desired that only such limitations be imposed on the appended claims as are stated therein or required by the prior art.

The invention claimed is:

1. In the process for the preparation of a diolefin polymerizate, the step of stripping unreacted olefinic components from the aqueous emulsion polymerizate mixtures after polymerization by volatilization thereof in the presence of a minor amount of an ester wax which is substantially water insoluble.

2. In the process for the preparation of a diolefin polymerizate, the step of stripping unreacted olefinic components from the aqueous emulsion polymerizate mixtures after polymerization by volatilization thereof in the presence of a minor amount of an ester wax which is substantially water insoluble, and characterised by the presence therein of a fatty acid component containing at least 18 carbon atoms.

3. In the process for the preparation of a diolefin polymerizate, the step of stripping unreacted olefinic components from the aqueous emulsion polymerizate mixtures after polymerization by volatilization thereof in the presence of a minor amount of an ester wax which is substantially water insoluble, comprising candelilla wax.

4. In the process for the preparation of a diolefin polymerizate, the step of stripping unreacted olefinic components from tht aqueous emulsion polymerizate mixtures after polymerization by volatilization thereof in the presence of a minor amount of an ester wax which is substantially water insoluble, comprising carnauba wax.

5. In the process for the preparation of a diolefin polymerizate, the step of stripping unreacted olefinic components from the aqueous emulsion polymerizate mixtures after polymerization by volatilization thereof in the presence of a minor amount of an ester wax which is substantially water insoluble, comprising montan wax.

6. In a process for the polymerization of butadiene to yield a coagulable aqueous emulsion of butadiene, the step of stripping unpolymerized butadiene from the latex, comprising the adding to the latex of a minor amount of an ester wax which is substantially insoluble in water.

7. In a process for the polymerization of butadiene to yield a coagulable aqueous emulsion of butadiene, the step of stripping unpolymerized butadiene from the latex, comprising the adding to the latex of a minor amount of an ester wax which is substantially insoluble in water, and thereafter volatilizing out the polymerized butadiene.

8. In a process for the emulsion copolymerization of butadiene and a second olefin, the step of stripping unreacted components from the aqueous polymer latex, comprising the steps of adding to the latex a minor amount of a water insoluble ester wax, volatilizing out the unreacted butadiene, and stripping out the second polymerizable component by the application of the latex of a current of steam.

9. In a process for the emulsion copolymerization of butadiene with acrylonitrile, the step of stripping unreacted components from the aqueous polymer latex, comprising the steps of adding to the latex a minor amount of a water insoluble ester wax, volatilizing out the unreacted butadiene, and stripping out the acrylonitrile by the application to the latex of a current of steam.

10. In a process for the emulsion copolymerization of butadiene with styrene, the step of stripping unreacted components from the aqueous polymer latex, comprising the steps of adding to the latex a minor amount of a water insoluble ester wax, volatilizing out the unreacted butadiene, and stripping out the styrene by the application to the latex of a current of steam.

11. In a process for the emulsion copolymerization of isoprene with acrylonitrile, the step of stripping unreacted components from the aqueous polymer latex comprising the steps of adding to the latex a minor amount of a water insoluble ester wax, and stripping out the unreacted components by the application to the latex of a current of steam.

12. In a process for the emulsion copolymerization of isoprene with styrene, the step of stripping unreacted components from the aqueous polymer latex comprising the steps of adding to the latex a minor amount of a water insoluble ester wax, and stripping out the unreacted components by the application to the latex of a current of steam.

JOHN C. ZIMMER.